Sept. 30, 1969 M. BARASH ET AL 3,470,331

FAULT-GENERATED SURGE RESPONSIVE FAULT LOCATING SYSTEM FOR FREQUENCY DIVISION MULTIPLEXED TRANSMISSION FACILITIES

Filed Dec. 29, 1966 2 Sheets-Sheet 1

Sept. 30, 1969 M. BARASH ETAL 3,470,331

FAULT-GENERATED SURGE RESPONSIVE FAULT LOCATING SYSTEM FOR FREQUENCY DIVISION MULTIPLEXED TRANSMISSION FACILITIES

Filed Dec. 29, 1966 2 Sheets-Sheet 2

INVENTORS M. BARASH
P. BROSTRUP-JENSEN
BY John K. Mullarney
ATTORNEY

United States Patent Office 3,470,331
Patented Sept. 30, 1969

3,470,331

FAULT-GENERATED SURGE RESPONSIVE FAULT LOCATING SYSTEM FOR FREQUENCY DIVISION MULTIPLEXED TRANSMISSION FACILITIES

Meyer Barash, Matawan and Per Brostrup-Jensen, Warren, N.J., assignors to Bell Telephone Laboratories, Incorporated, Murray Hill, N.J., a corporation of New York Filed Dec. 29, 1966, Ser. No. 605,790
Int. Cl. H04b *3/46*
U.S. Cl. 179—175.3 8 Claims

ABSTRACT OF THE DISCLOSURE

An automatic fault locator which measures the time of propagation of fault-generated surge signals is adapted for fault locating in a multiplex transmission system. Fault surge monitors at each end of the multiplex transmission system each comprise two fault surge signal detectors which are connected to substantially adjacent multiplex message channels located in a frequency range of minimum delay. When fault surge signals occur in both substantially adjacent channels, a monitoring system is activated to locate the fault. Auxiliary equipment verifies this fault location by timing a fault surge signal in a multiplex message channel located in a frequency range of maximum delay with respect to one of the fault surge signals occurring in the frequency range of minimum delay.

This invention relates to fault locating systems and, more particularly to fault locating systems which measure the propagation time of fault-generated surges.

BACKGROUND OF THE INVENTION

Trans-Atlantic telephone communication signals are currently transmitted via frequency division multiplexed submarine telephone cables. The present cable capacity permits well above a hundred message channels in a single submarine cable. Each message channel in each direction of the cable is defined by a carrier frequency having specially filtered transmitters and receivers at each terminal of the cable to transmit and recover each message channel. A fault in the cable interrupts all the message channels simultaneously and hence must be corrected promptly. In the case of a permanent fault, the cable path is structurally interrupted and no further signal transmission is possible. In the case of a momentary fault, the cable may resume signal transmission after a short time interval. Momentary faults in a submarine telephone cable may be due, for instance, to a momentary flash-over or a breakdown of the high D.C. voltage present in the cable to energize the repeaters.

The necessity of accurately locating these faults is readily apparent in the case of a permanent fault with a structurally interrupted cable. It is, however, equally important to locate momentary faults, even though the interruption of signal transmission is only temporary. While no apparent damage may appear to occur at the time of a momentary fault, slight damage to the cable insulation may be the cause of serious damage resulting in a subsequent permanent fault. It is therefore important to locate both permanent and momentary faults promptly so that the damage may be repaired.

Fault locating systems which measure the propagation time of fault-generated surges are extremely fast in locating faults since they do not require complicated manual measuring techniques. These fault locating systems generally comprise fault-generated surge responsive automatic counting equipment which is installed at either one or both end terminals of the transmission facility or cable. Both types of the above-mentioned fault locating systems are described in an article entitled, "Fault Location Methods for Overhead Lines," by T. W. Stringfield, D. J. Marihart, and R. F. Stevens in the AIEE Transactions, part III (Power Apparatus and Systems), vol. 76, August 1957, pages 518–30. More specifically, a two counter fault locating system described therein utilizes fault surge monitoring equipment to detect the arrival of oppositely directed fault-generated surges at the opposite ends of a power transmission line. The detected fault-generated surges are utilized to halt two free running synchronized electronic counters located respectively at the two ends. The counter at one end acts as a master counter, and the counter at the other end is brought into synchronism with the master counter. This synchronism is created and maintained by transmitting a carrier tone from the master counter along the transmission line to the counter at the other end. The respective counts at which the two counters are stopped by the detected fault-generated surges are utilized to calculate the exact fault location. At the termination of a fault locating operation the two counters must be restarted in synchronism in order to detect subsequent faults.

The aforementioned system is suitable for the needs of commercial electric power transmission lines. The counters of the above-described fault locating system, however, do not run continuously and become inoperative after each detected fault. This requires that time be expended in resetting the counters in synchronism after each fault. Hence quickly recurring subsequent momentary faults may escape detection. Additionally, the bandwidth requirements, in utilizing a carrier signal to start and maintain the counters in synchronism, are too large to permit the use of this expedient in communication type cables.

It is furthermore convenient in the case of multiplex transmission facilities to detect fault surges via the multiplexing apparatus. However, it is necessary to distinguish between faults per se and a malfunction of the multiplex apparatus in a single band of message channels which latter condition the aforementioned system cannot determine.

It is therefore an object of the invention to continuously monitor a submarine telephone cable for fault-generated surges without significant inoperative periods.

It is another object of the invention to locate faults in a submarine telephone cable by using synchronous counters at both ends of the cable with a minimum expenditure of bandwidth of the transmission facility in setting and maintaining the counters in synchronism.

It is still another object to avoid false indications of the detection of a fault which may be due to a malfunction of the multiplexing apparatus in a particular band of message channels.

It is yet another object to locate faults in a submarine telephone cable with a greater degree of accuracy than has heretofore been possible.

SUMMARY OF THE INVENTION

Therefore, in accordance with the present invention, fault locating apparatus is provided to locate faults in a multiplexed submarine telephone cable by timing the respective arrivals of fault-generated surges at the opposite ends of the cable. In response to a simulated fault surge, separate counters, at each end of the cable, are set running in synchronism with a pilot signal supplied by the transmission facility. A divider associated with each counter runs continuously in response to the pilot signal and generates periodic synchronization signals utilized to reset the counters in synchronism after the printing of a counter readout. Fault surge monitoring equipment at each end of the cable acts in response to a fault-generated surge to read out the instantaneous count of the counter located at that end. The fault surge monitoring equipment comprises two fault surge signal detectors which are connected to two multiplex group bands substantially adjacent in the multiplex plan. Each group band contains a plurality of individual message channels. The fault surge detectors are connected to a coincidence gate whose output is utilized to instantaneously read out the count of the counter at that end of the cable. The coincidence arrangement prevents false operation of the fault locating apparatus that may occur due to a malfunction of the multiplex apparatus in the message channels of a single group band.

A feature of the invention is the utilization of the fault locating system in combination with auxiliary equipment to permit the instant verification of the location of a detected fault. The auxiliary equipment detects the arrival of a fault-generated surge in a multiplex group band located in a frequency range having a signal delay time significantly different from that of the aforementioned adjacent multiplex group bands. The time difference of the respective arrivals of the fault-generated surges is converted into a distance measurement to verify the location of the fault.

Another feature of the invention is the utilization of simulated fault surges to enable the synchronization of the counters with the pilot signal. This permits the use of a narrow bandwidth pilot signal which does not interfere with the message channel capacity of the submarine telephone cable.

BRIEF DESCRIPTION OF THE DRAWINGS

These and other objects and features of the invention will appear more clearly upon consideration of the following detailed description of an illustrative embodiment of the invention taken in conjunction with the drawings wherein.

DESCRIPTION OF THE PREFERRED EMBODIMENT

Figures 1, 3:
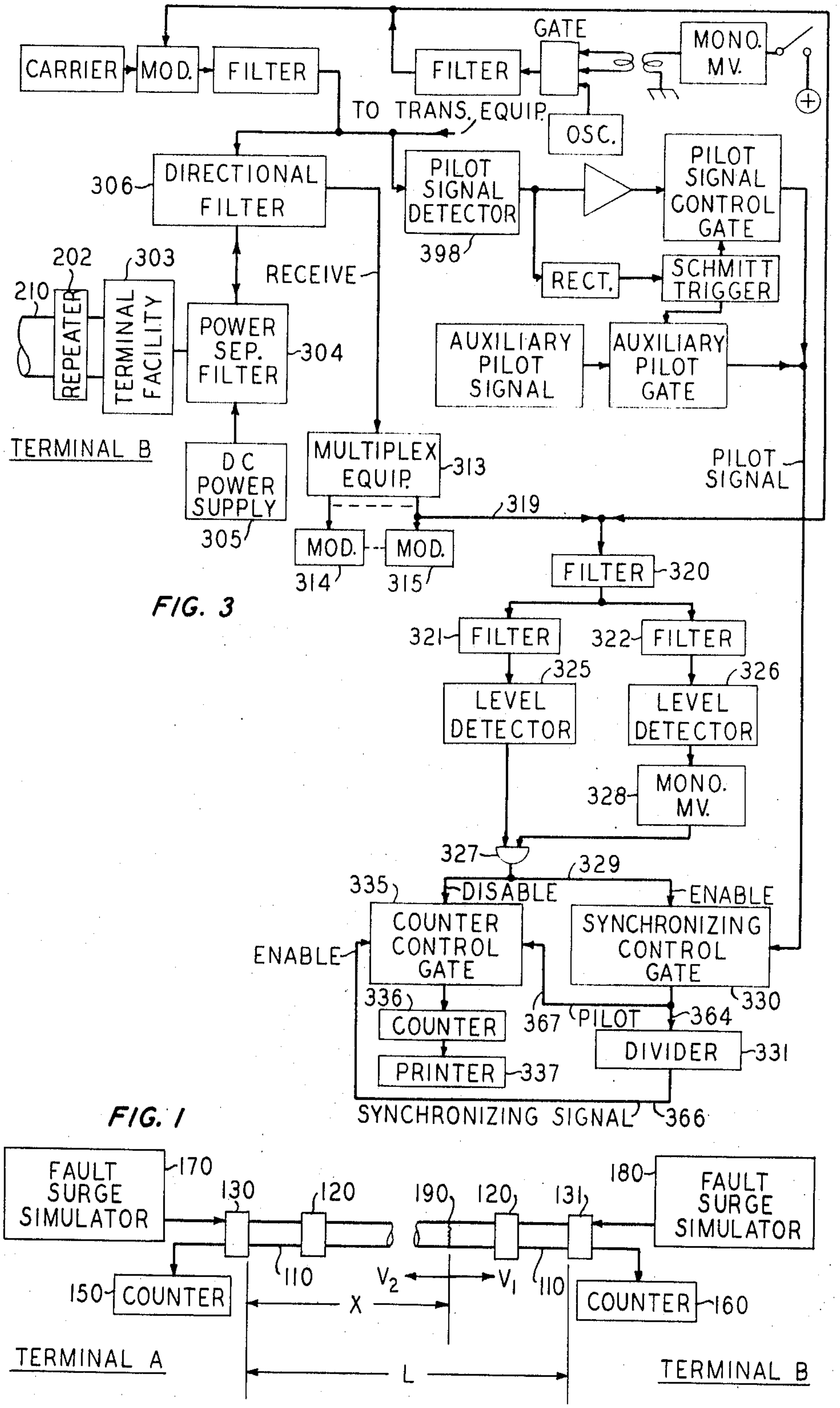
FIG. 1 is a schematic block diagram illustrative of the method by which the present invention locates faults by timing the arrivals of fault-generated surges at the terminal ends of a submarine telephone cable.
FIGS. 2 and 3, when positioned as shown in FIG. 4, are a detailed schematic block diagram of one illustrative embodiment of a fault locating system according to applicants' invention as applied to a submarine telephone cable transmission facility.

FIG. 1 shows a transoceanic frequency division multiplexed submarine telephone cable 110, including the repeaters 120, interconnecting two terminal facilities 130 and 131, respectively, located at terminal A and terminal B. The cable 110 transmits two-way multiplexed communication signals with different frequency bands assigned to each direction. Directional filters in the repeaters 120 cause the velocities of signal propagation in each direction to differ.

A counter 150 is connected to the terminal facility 130 at terminal A and a similar counter 160 is connected to the terminal facility 131 at terminal B. The counters 150 and 160 count in synchronism. The synchronism of the two aforementioned counters is initiated via simulated fault surges which are transmitted along the cable 110 in both directions. These simulated fault surges are generated respectively by the fault surge simulators 170 and 180. The two counters 150 and 160, as described below, with reference to FIGS. 2 and 3 each include apparatus to read out the existing count instantaneously when a fault-generated surge is detected, at the terminal facilities 130 and 131, respectively.

A fault is indicated as occurring in the cable 110 at the location 190 for the purposes of illustrating the method of locating the fault. This indicated fault may be of a permanent or a momentary nature. The sudden collapse of voltage in the cable at the location 190, due to the fault, causes fault-generated surges to propagate along the cable 110 in both directions, towards the two terminal facilities 130 and 131, respectively. The instantaneous counts of the synchronized counters 150 and 160 are recorded when the respective fault-generated surges arrive at each of the terminal facilities 130 and 131. The recorded count outputs of the two counters are compared to determine the actual location of the fault. The method of synchronization and comparison takes into account the different propagation velocities of the detected fault-generated surges in the two directions without the necessity of knowing the actual propagation velocity in each direction.

In setting the fault locating system into synchronization, the two counters 150 and 160 are initially preset to a zero count. The fault surge simulator 170 at terminal A is activated, and a simulated fault surge is generated to start counting action in each of the counters 150 and 160. The simulated fault surge is applied directly to the counter 150 to start it instantaneously. The simulated fault surge is also simultaneously applied to the cable 110 and is transmitted thereover to start counting action in the counter 160. Hence the counter 160 lags the counter 150 by the transmission time of the simulated fault surge from terminal A to terminal B. The fault surge simulator 180 at terminal B is subsequently activated, and the respective times at which the simulated fault surge arrives at the counters 160 and 150 are recorded. In this fashion a roundtrip signal propagation time is determined. This measured roundtrip propagation time is required for the location of subsequent faults, as described in detail hereinbelow.

The fault at location 190, as described above, causes fault-generated surges to be propagated in both directions from the fault, towards the terminal facilities 130 and 131, respectively, at terminal A and terminal B. The fault-generated surge propagating towards terminal B will proceed at velocity $V_1$; the fault-generated surge propagating towards terminal A will proceed at a different velocity $V_2$. The different velocities $V_1$ and $V_2$ correspond to the different signal frequencies transmitted in each direction. The counters 150 and 160 in response to the arrival of each fault-generated surge read out their respective instantaneous counts. The counter 150 will read out a count $C_{150}$ of the cycles of the pilot frequency P, wherein $$C_{150}=\left(T+\frac{L}{V_1}+\frac{X}{V_2}\right)P \tag{1}$$

where

T=time elapsed from the initiation of counting in the counter 160, $L/V_1$=time of propagation from terminal A to terminal B (i.e., represents the time by which the counter 160 lags counter 150), and $X/V_2$=time of propagation from the fault to terminal A.

The counter 160 will read out a count $C_{160}$ of $$C_{160}=\left(T+\frac{(L-X)}{V_1}\right)P \tag{2}$$

where $(L-X)/V_1$=time of propagation from the fault to terminal B. The difference in the read out counts of the counters 150 and 160 is therefore $$C_{150}-C_{160}=X\left(\frac{1}{V_1}+\frac{1}{V_2}\right)P \tag{3}$$

The measured count R of the roundtrip transmission time as determined by the above described synchronization procedure is $$R=\left(\frac{L}{V_1}+\frac{L}{V_2}\right)P=L\left(\frac{1}{V_1}+\frac{1}{V_2}\right)P \quad (4)$$

where $L/V_2$=time of propagation from terminal B to terminal A. The distance to the fault is therefore determined by the proportion $$\frac{X}{L}=\frac{C_{150}-C_{160}}{R} \quad (5)$$

Thus it is readily apparent that the above described synchronizing and fault locating procedure will accurately locate faults taking fully into account the different propagation velocities in the opposite directions without the necessity of actually determining these individual propagation velocities.

Figures 2, 4:
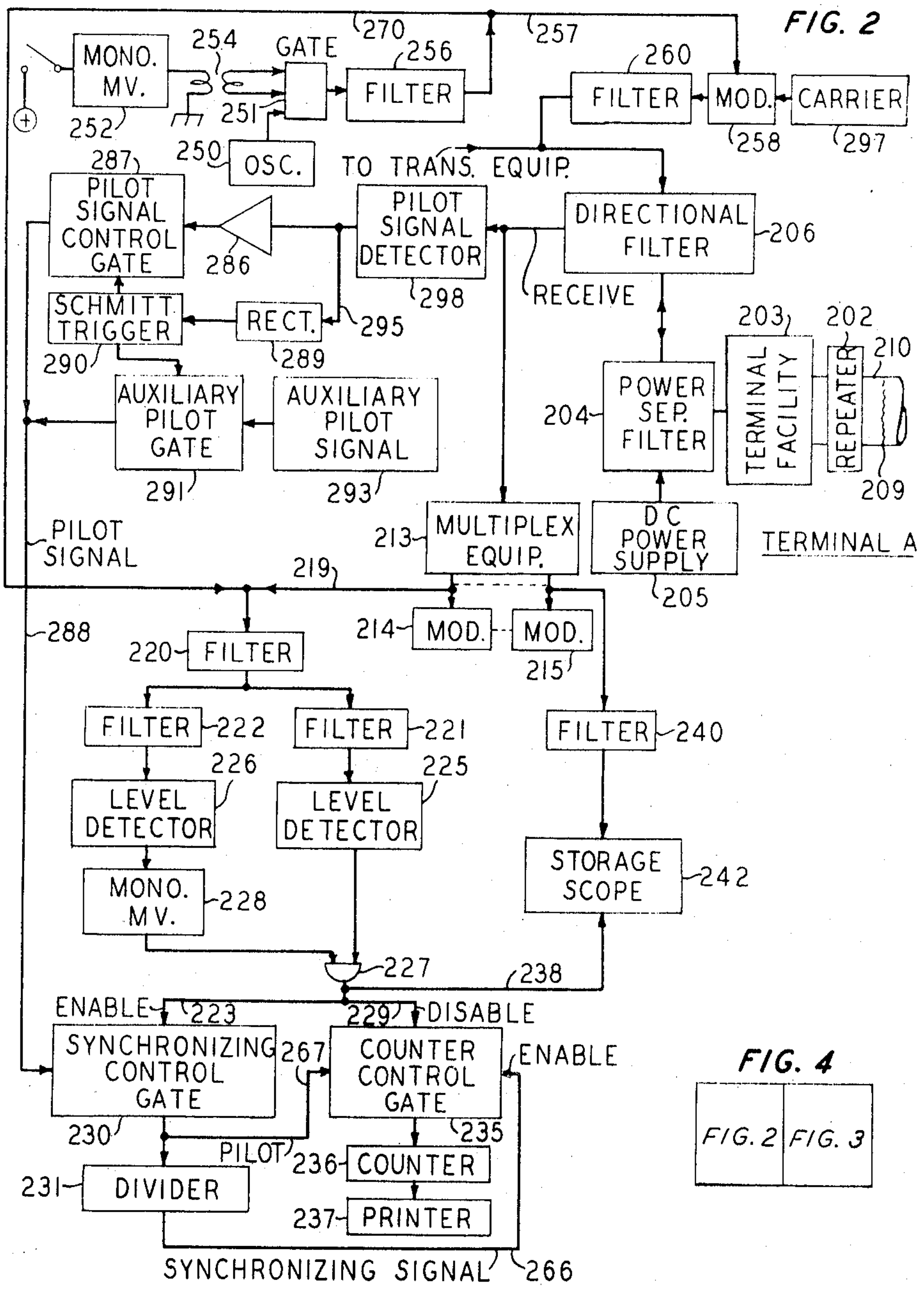

FIGS. 2 and 3 positioned as shown in FIG. 4, show an illustrative embodiment of the invention implementing the principles disclosed in FIG. 1 as applied to a typical frequency division multiplexed submarine cable transmission facility such as is currently in use in transatlantic telephone service. A submarine cable 210 is shown interconnecting two terminal facilities 203, and 303, respectively, located at terminal A and terminal B. The submarine cable 210 may, for example, comprise an armorless coaxial cable.

Spaced along the cable 210 at intervals are repeaters or bidirectional amplifiers 202 to amplify the multiplexed message signals traversing the cable 210. The frequency division multiplexed message signals are transmitted along the cable 210 in both directions. The repeaters 202 each have directional filter circuits which permit them to amplify the two bands of multiplexed message signals traveling in each direction. The multiplexed message signals traveling in one direction may be, for example, grouped in a frequency range of approximately 100 kc. to 500 kc. The multiplexed message signals traveling in the opposite direction may be grouped in a frequency range of approximately 650 to 1,050 kc.

The direct current power supplies 205 and 305, respectively located at each end of the cable 210, supply power, via the cable 210, to the repeaters 202 to energize the amplifiers contained therein. The multiplexed message signals transmitted and received at each terminal facility 203 and 303 of the cable 210 are respectively isolated from the direct current power supplies 205 and 305 by the power separation filters 204 and 304 which are respectively connected to the directional filters 206 and 306.

The received multiplexed message signals at each terminal facility 203 and 303 are respectively transmitted by the directional filters 206 and 306 to the multiplex signal receiving equipment 213 and 313.

At terminal A the multiplex signal receiving equipment 213 separates each message channel from the combined plurality of received multiplexed signals and applies the signals in these channels to a plurality of demodulators indicated by the demodulators 214 and 215. The outputs of the demodulators 214 and 215 are applied to local equipment, not shown, which serves individual customers. The multiplex signal receiving equipment 313 and the demodulators indicated by the demodulators 314 and 315 at terminal B operate in the same described manner. A complete description of the equipment and operation of the above-described submarine cable system may be found in an article entitled "The SD Submarine Cable System" in the Bell System Techanical Journal, July 1964, vol. XLIII, No. 4, part 1, pages 1155–1184.

The fault locating equipment at each terminal is described hereinbelow with reference to its operation upon the occurrence of a fault. A fault is indicated as occurring at location 209 in the cable 210, as illustrated in FIG. 2.

The fault causes fault-generated surges to propagate in both directions away from the fault location 209 towards terminal A and terminal B. For the purposes of explanation, it is assumed that the counters provided according to the invention at both terminal A and terminal B have been previously synchronized in the manner to be described hereinbelow. The fault-generated surge propagated towards terminal A is received at the terminal facility 203 and directed by the power separation filter 204 to the directional filter 206.

This fault-generated surge is subsequently applied by the directional filter 206 to the multiplex signal receiving equipment 213. Signals in the message channels, due to the fault-generated surge, are transmitted through the mulitplex signal receiving equipment 213, via lead 219, to a filter 220. The filter 220 has a pass band which transmits only two selected group bands which are preferably frequency adjacent in the multiplex plan. These two group bands are preferably selected at the minimum delay and minimum delay distortion frequency in the direction of transmission towards the terminal 203. The two selected adjacent group bands are transmitted by the filter 220 to the two parallel connected filters 221 and 222 each of which selectively transmits a different one of the two group bands.

The signal outputs of the two filters 221 and 222 are respectively applied to the level detectors 225 and 226. The level detectors 225 and 226 may comprise threshold amplifiers preset to respond only to signal levels which exceed some predetermined signal magnitude, representative of a fault-generated surge.

A monostable multivibrator 228 is arranged to switch into its quasi-stable state in response to the signal output of the level detector 226 and apply a signal to a coincidence gate 227. The signal output of the multivibrator 228 has a duration in the illustrative embodiment of 30 microseconds. The signal ouput of the level detector 225 is applied directly to the coincidence gate 227. The multivibrator 228 by providing a continuous signal insures operation of the coincidence gate 227 in the event the respective outputs of the level detectors 225 and 226 are out of phase.

In response to the coincident signals supplied by the level detector 225 and the multivibrator 228, the concidence gate 227 applies an output signal, via lead 229, to the counter control gate 235. This gate functions in response to the coincidence signal to control the application of a pilot signal to counter 236. As indicated above, the pilot signal is derived from the submarine cable system itself. The manner in which this signal reaches the counter control gate will be described below. The counter 236 which may comprise a decimal counter, normally counts the cycles of the pilot signal transmitted to it, via lead 267 and the counter control gate 235. With the application of the pilot signal inhibited by a disabled counter control gate 235, the counter 236 halts counting and prints out in the printer 237 that count at which counting action stops.

The pilot signal of the submarine cable system is applied, via lead 288, to a synchronizing control gate 230 is transmitted, via the synchronizing control gate 230 when enabled by gate 227 to the divider 231. The divider 231, which may comprise a decimal divider circuit, acts in response thereto to count the cycles of the pilot signal and after a specified count generate a synchronizing signal which is applied to the counter control gate 235, via lead 266.

The first synchronizing signal generated by the divider 231 subsequent to the print out of the counter 236 reenables the disabled counter control gate 235. Hence the pilot signal is again applied to the counter 236 and it resumes counting. The time interval between synchronizing pulse outputs of the divider 231 is small so that immediate subsequent faults will be detected.

At the terminal A this pilot signal, detected at the directional filter 206 is applied via the pilot signal detector 298 and the amplifier 286 to the pilot signal control gate 287. The pilot signal control gate 287 is enabled by the signal supplied to its by the Schmidt trigger circuit 290 and transmits the pilot signal via lead 288 to the synchronizing control gate 230.

The synchronizing control gate 230, when enabled, transmits the pilot signal to the divider 231. The divider 231 counts the cycles of the pilot signal and after a specified number of cycles applies a synchronizing signal, via lead 266 to the counter control gate 235. This synchronizing signal is utilized to re-enable the disabled counter control gate 235 after each fault and permit the counter 236 to continue counting the pilot signal.

The pilot signal is also applied via lead 295 to a rectifier 289 which utilizes the D.C. component thereof to energize the Schmidt trigger circuit 290. The Schmidt trigger circuit 290 in response to the continued application of the aforementioned D.C. component continues to enable the pilot signal control gate 287. However, if the pilot signal should fail for any reason, the D.C. component is removed and the Schmidt trigger circuit 290 is de-energized. The absence of an output signal from the Schmidt trigger circuit 290 enables the auxiliary pilot gate 291 which permits the auxiliary pilot signal, generated by the auxiliary pilot signal source 293, to be applied via lead 288 to the synchronizing control gate 230. The auxiliary pilot signal is provided as a safety feature to insure that synchronization will be maintanied even though defects in the equipment should temporarily remove the pilot signal from service.

Identical equipment to utilize the pilot signal to synchronize the counters is also included at terminal B, as shown in FIG. 3. The pilot signal detector 398 receives the pilot signal before it is transmitted to the directional filter 306 and cable 210. Since the operation of the pilot circuitry is identical to that described in FIG. 2, it is not believed necessary to describe its operation.

The oppositely directed fault-generated surge propagating towards terminal B is processed in the same manner as described above for the fault-generated surge propagating towards terminal A. The fault-generated surge received at terminal facility 303 at terminal B is transmitted via the power separation filter 304 and the directional filter 306 to the multiplex signal receiving equipment 313. The outputs of two selected adjacent group bands of the multiplex signal receiving equipment 313 are applied via lead 319 to the filter 320.

The filter 320 has a pass band permitting the transmission of the high amplitude signals due to the fault-generated surge in two adjacent group bands. The signals in these group bands are applied to the bandpass filters 321 and 322, each of which respectively transmit one of the two group bands to the level detectors 325 and 326. The level detectors 325 and 326, in turn, respond to the signal amplitudes caused by the fault-generated surges and produce signal outputs.

The monostable multivibrator 328 in response to the output of the level detector 326 operates in the same manner as the monostable multivibrator 228 shown in FIG. 2. The combined signal outputs of the level detector 325 and the multivibrator 328 enable the coincidence gate 327, producing an output signal therefrom. The output of the coincidence gate 327 disables the counter control gate 335 thereby inhibiting application of the pilot signal to the counter 336 and hence its counting action is halted.

The count of the counter 336 is printed out in the printer 337. The respective counts obtained at the printer 237 and the printer 337 are compared to determine the location of the fault in the same manner as was described with reference to FIG. 1.

An auxiliary apparatus is additionally provided at terminal A to verify the determination of a fault location which is obtained by comparing the respective count print-outs at terminal A and terminal B. A group bandpass filter 240 is connected to the multiplex signal receiving equipment 213. This group band transmitted therein is preferably selected near the edge of the frequency range of the entire band of multiplex channels received at terminal A. The signal propagation velocity of this group band is significantly slower with respect to the aforementioned adjacent multiplex group bands. This reduced propagation velocity is due to the delaying effect of the directional filters included in the repeaters 202 upon channels near the edge of the frequency range.

The coincidence gate 227 in response to a fault-generated surge supplies a signal via lead 238 to start the time base of a storage oscilloscope 242. The large amplitude signal in the aforementioned group band at the edge of the frequency range due to the fault-generated surge is also visually recorded on the storage oscilloscope 242. The time difference between the two aforementioned signals applied to the storage oscilloscope 242 is directly proportional to the number of repeaters 202 the fault-generated surge has traversed. Hence this time difference gives a direct indication of the location of the fault and may be used to verify the location of the fault as determined by comparing the counts printed out at terminals A and B by the printers 237 and 337.

The counters 236 and 336 at terminals A and B must be initially synchronized and the round trip propagation time measured so that the respective count printout responsive to detected fault-generated surges may be used to locate the fault. As described with reference to FIG. 1, this synchronization is achieved via the sequential application of simulated fault surges to the cable 210 at the terminals A and B. Identical fault surge simulator apparatus to generate these simulated fault surges is shown included at both terminals. The synchronization process will be described with reference to the fault surge simulator apparatus disclosed in FIG. 2. This apparatus generates a simulated fault surge which traverses the cable 210 from terminal A to terminal B. The fault surge simulator apparatus disclosed in FIG. 3 operates in an identical fashion and generates a simulated fault surge which traverses the cable 210 in the opposite direction.

The fault surge simulator apparatus disclosed in FIG. 2 comprises an oscillator 250, which generates high frequency signals preferably located in the midrange of the frequency band of the received multiplexed group band signals. The output of the oscillator 250 is connected to a transmission gate 251. The output of a manually triggered monostable multivibrator 252 controls the transmission gate 251 via the transformer 254. The short pulse output of the monostable multivibrator 252 induces a pulse signal in the secondary of the transformer 254. This pulse signal applied to the transmission gate 251 enables a short signal burst from the oscillator 250 to be transmitted to a filter 256. The filter 256 is a bandpass filter which concentrates the energy of the short signal burst into the frequency band of the two adjacent multiplex group bands of the filters 221 and 222.

The simulated fault surge output of the filter circuit 256 is simultaneously applied both to the cable 210 and to the fault surge detection circuitry at terminal A. The simulated fault surge to be applied to the cable 210 is transmitted via lead 257 to the modulator 258 where it is utilized to modulate a high frequency carrier signal supplied by the carrier source 297. The frequency of the signal output of the modulator 258 is selected to equal the frequency band transmitted by the filters 321 and 322 after processing by the multiplex signal receiving equipment 313. The modulated carrier signal is applied via a bandpass filter 260 to the directional filter 206 which applies it to the cable 210.

This simulated fault surge is received by the terminal facility 303 at terminal B and is transmitted via the multiplex signal receiving equipment 313 to the filter circuit 320. The simulated fault surge is processed by the filters 321 and 322 and the level detectors 325 and 326, as are the fault-generated surges described hereinabove. The coincidence gate 327, in response thereto, applies a signal via lead 329 to the synchronizing control gate 330 to enable transmission, therein, of the pilot signal.

For the purposes of initial synchronization, as described above with reference to FIG. 1, the counters 236 and 336 and the dividers 231 and 331 are preset to a zero count. The synchronization control gates 230 and 330 have been manually preset in a disabled condition to inhibit the application of the pilot signals to the counter control gates 235 and 335 via lead 267 and 367, respectively. The counter control gates 235 and 335 are likewise initially in a disabled condition. In response to the signal output of the coincidence gate 327, the synchronizing control gate 330 is enabled; consequently, the synchronizing control gate 330 applies the incident pilot signal, via lead 364 to the divider 331. The divider 331 in response thereto counts the cycles of the pilot signal and after a specified count applies a synchronization signal via lead 366 to enable the counter control gate 335. The enabled counter control gate 335 transmits the pilot signal to the counter 336 initiating counting action therein.

The simulated fault surge output of the filter 256, as indicated above, is also simultaneously applied, via lead 270, to the filter 220 at terminal A. This simulated fault surge is processed by the filters 221 and 222 and the level detectors 225 and 226 in the same manner as a fault-generated surge. The coincidence gate 227, in response thereto, applies an output signal, via lead 223, to enable the synchronizing control gate 230. The enabled synchronizing control gate 230 applies the pilot signal to the divider 231 which after a fixed countdown cycle applies a synchronizing signal, via lead 266, to the enabling input of the counter control gate 235.

The pilot signal is applied to the counter control gate 235 via the enabled synchronizing control gate 230 and lead 267. The enabled counter control gate 235 transmits the pilot signal to the counter 236 initiating counting action therein. By thus utilizing the simulated fault surge to permit the dividers 231 and 331 and the counters 236 and 336 to respond to the pilot signal; the pilot signal may have a narrow bandwidth and hence not reduce the message channel capacity of the cable 210. The simulated fault surge is short in duration and is used relatively infrequently, so that it does not interfere with normal communication signals transmitted through the cable 210.

The round-trip propagation time is determined, as previously disclosed with reference to FIG. 1, by activating the fault surge simulator apparatus located at the terminal B. The mode of operation is exactly the same as that described with reference to the fault surge simulator apparatus located at terminal A, except as follows: The dividers 231 and 331 and the counters 236 and 336 are now counting. The printers 237 and 337 each print out a count in response to the arrival of the simulated fault surge. Hence it is not believed necessary to describe this process.

Once synchronization has been established, synchronization is maintained in the counters after each fault detection operation by utilization as described hereinbelow of the aforementioned pilot signal which is incident to the submarine telephone cable system. The source of the pilot signal is not discussed in detail herein; however, a complete description of the same is included in the aforementioned article in the Bell System Technical Journal.

It is readily apparent to those skilled in the art that the above described fault locating system is continuously operating and hence is capable of detecting faults closely sequenced in time. The above fault locating system also advantageously permits accurate and reliable fault locating while also allowing the locating apparatus to be connected to the cable, via the multiplexing apparatus.

While the above invention has been described with respect to one specific illustrative embodiment, many variations of the invention will suggest themselves to those skilled in the art without departing from the spirit and scope of the invention.

What is claimed is:

1. Apparatus to locate faults in a frequency division multiplexed transmission cable interconnecting a first terminal and a second terminal comprising first counting means at said first terminal, second counting means at said second terminal, means to synchronously drive said first and second counting means, fault surge monitoring means at each of said terminals, each of said fault surge monitoring means comprising first and second fault surge detectors coupled to multiplex group bands which are substantially frequency adjacent in the multiplex plan, a coincidence gate arranged to receive the outputs of the fault surge detectors so as to provide an output upon coincidence of the outputs of said fault surge detectors and means at each terminal for connecting the coincidence gate output of the fault surge monitoring means to control the counter at the fault surge monitoring to control the counter at that terminal to read out the instantaneous count when the coincidence gate applies a signal to its respective counter.

2. Apparatus as defined in claim 1 wherein one of said fault surge monitoring means at one of said terminals further includes a third fault surge detector coupled to a group band substantially separated in the multiplex plan from said group bands which are substantially frequency adjacent and means to record the time differential between fault surges arriving at said first and second fault surge detectors and said third fault surge detector.

3. Apparatus as defined in claim 1 further including means to simulate fault surges at both said first and second terminals, means to apply the output of each of said fault surge simulating means to the adjacent first and second fault surge detectors at each of said terminals and to said transmission cable.

4. Apparatus as defined in claim 1 wherein said means to synchronously drive said first and second counting means includes first and second frequency division means respectively located at said first and second terminals, a signal source of stable frequency coupled to said first and second counting means and to said first and second frequency division means, means to utilize said source of stable frequency to drive said first and second counting means and said first and second frequency division means, means to respectively decouple said source of stable frequency from said first and second counting means in response to the output of the coincidence gate at said first and second terminals and means to utilize the output of said first and second frequency division means to respectively subsequentially recouple in synchronism said source of stable frequency to said first and second counting means.

5. Apparatus to locate faults in a frequency division multiplexed transmission cable interconnecting a first terminal and a second terminal comprising, first counting means at said first terminal, second counting means at said second terminal, a signal source of constant frequency, first frequency division means at said first terminal, said first and second frequency division means being coupled to said source of constant frequency, means to respectively connect the outputs of said first and second frequency division means to said first and second counting means so as to synchronize both said counting means, first fault surge monitoring means at said first terminal, second fault surge monitoring means at said second terminal, said first and second fault surge monitoring means each comprising a first and second fault surge detector responsive to signals significantly exceeding the normal multiplex signal level and respectively coupled to adjacent multiplex group bands located in a frequency range of minimum delay of said transmission cable, said first and second fault surge monitoring means each further including coincidence gate means, means to connect the outputs of each of said first and second fault surge detectors to their respective coincidence gate means, and means to respectively read out the count of said first and second counters in response to the respective outputs of each of said coincidence gate means.

6. Apparatus as claimed in claim 5 wherein said first fault surge monitoring means further includes a third fault surge detector coupled to a multiplex group band located in a frequency range of maximum delay and means to time the time differential between fault surges arriving at said first and second fault surge detectors and said third fault surge detector.

7. Apparatus as claimed in claim 6 further including means to generate simulated fault surges respectively located at both said first and second terminals, means to simultaneously couple said simulated fault surge at each of said terminals to the adjacent fault surge monitoring means and to said transmission cable wherein said simulated fault surge is utilized to initiate counting action in said first and second counters.

8. Apparatus as claimed in claim 7 further including an auxiliary signal source of constant frequency and means to couple said auxiliary signal source to said first and second frequency division means upon failure of said signal source of constant frequency.

References Cited

UNITED STATES PATENTS

| | | | |
|---|---|---|---|
| 2,315,383 | 3/1943 | Andrews | 324—52 |
| 2,315,450 | 3/1943 | Nyquist | 324—52 |
| 2,522,362 | 9/1950 | Gilbert | 324—52 |
| 2,628,267 | 2/1953 | Stringfield | 324—52 |
| 2,717,992 | 9/1955 | Weintraub | 324—52 |
| 2,725,526 | 11/1955 | Stringfield | 324—52 |
| 2,794,071 | 5/1957 | Hughes | 179—175.3 |
| 3,281,673 | 10/1966 | Richardson | 324—52 |
| 3,408,564 | 10/1968 | Hoel | 324—52 |

KATHLEEN H. CLAFFY, Primary Examiner

A. A. McGILL, Assistant Examiner

U.S. Cl. X.R.

324—52